United States Patent [19]

Dochterman

[11] 4,186,319
[45] Jan. 29, 1980

[54] DYNAMOELECTRIC MACHINE END SHIELD

[75] Inventor: Richard W. Dochterman, Fort Wayne, Ind.

[73] Assignee: General Electric Company, Fort Wayne, Ind.

[21] Appl. No.: 791,052

[22] Filed: Apr. 26, 1977

[51] Int. Cl.² ............................................. H02K 5/00
[52] U.S. Cl. ........................................ 310/89; 310/90; 310/91; 310/42; 220/327; 310/59
[58] Field of Search ....................... 310/89, 90, 85, 42, 310/40 MM, 55, 91, 58, 59, 60; 220/66, 327

[56] References Cited

U.S. PATENT DOCUMENTS

| | | | |
|---|---|---|---|
| 3,081,411 | 3/1963 | Wiley | 310/89 |
| 3,313,968 | 4/1967 | Kaiser | 310/89 |
| 3,343,016 | 9/1967 | Lewis | 310/90 |
| 3,463,949 | 8/1969 | Stone | 310/89 |
| 3,490,820 | 1/1970 | Lewis | 310/85 |
| 3,515,918 | 6/1970 | Otto | 310/90 |
| 3,529,874 | 9/1970 | Hoddy | 310/90 |
| 3,555,320 | 1/1971 | Johnson | 310/89 |
| 3,848,837 | 11/1974 | Dochterman | 310/91 |

OTHER PUBLICATIONS

G. E. Co. Bulletin; GEA-7890A, cover and p. 6, Jan. 1974. G. E. Co. Bulletin GIA 250-1A, Page 61.

*Primary Examiner*—R. Skudy
*Attorney, Agent, or Firm*—Ralph E. Krisher, Jr.

[57] ABSTRACT

A dynamoelectric machine end shield for closing the ends of a cylindrical shell, the end shield comprising a pattern of valleys and plateaus to create a reinforcing rib pattern that provides increased strength. The end shield, which may be formed from thin cross section sheet material, provides a close fitting rabbet that does not require machining and provides a structure that will not transmit possible distortion of the lighter gauge material from the mounting bolts to the bearing. Because of the additional strength afforded by the reinforcing rib pattern, radially inward displacement of the extended portions of extended clamp bolts also is minimized.

6 Claims, 4 Drawing Figures

DYNAMOELECTRIC MACHINE END SHIELD

BACKGROUND OF THE INVENTION

The present invention relates to dynamoelectric machines in general and more particularly to improved end frame or end shield constructions.

One common form of dynamoelectric machine, such as small horsepower motors includes a stator housed in a shell and a rotor secured to a shaft, which is rotatably supported by one or more sleeve type bearings supported by end shield or end frame means that in turn are connected to and supported by the shell. Heretofore, known arrangements have included those where end shields or end frames abut against the shell at its ends, e.g., with a continuous or uninterrupted rabbet connection to complete the shell frame.

In practice, many end shields or end frames are formed of cast material or of relatively thick (e.g., 0.073 of an inch thick) stamped steel, but with rising material costs, it is desirable to make use of thinner steel (e.g., 0.056 of an inch, for purposes of comparison). However, end shields or end frames of existing designs and produced from thin steel would not be completely satisfactory because they would not be strong enough or rigid enough to provide a desired bearing mounting free from distortion caused by stresses transmitted from mounting bolt or through bolt locations to the bearing supporting region of the end frame. Accordingly, it would be desirable to provide a satisfactory end shield or end frame made of steel that is only one half to three-quarters as thick as has been used heretofore for a given motor frame size and which thus will offset rising material costs. Desirably, such improved end frame will also provide a close fitting rabbet that will not require machining, and will provide a structure of greater strength than a generally flat end shield (or frame) design of thicker material. Moreover, such end shield will desirably isolate possible distortion effects of clamp bolts from the bearing supporting portion of the end shield.

SUMMARY OF THE INVENTION

An end frame assembly embodying the present invention, in one form thereof comprises a member of relatively thin cross section sheet material having a central portion thereof formed in a manner to support a bearing. This central portion includes a circular element having generally concentric axially extending cylindrical portions. One such portion (called a rearwardly extending cylindrical portion for reference) terminates in an annular web and the annular web terminates in the other such portion (called, for reference, a forwardly extending cylindrical portion). The rearwardly extending portion (or portion of smaller diameter) comprises a bearing support hub. The circular element is provided with a central annular portion surrounding the rearwardly extending cylindrical portion. Radial spokes extend from the central annular portion (these spokes may be oriented at convenient angles with respect to each other) to a peripheral edge portion. The central annular portion, the spokes, and the peripheral edge portion are substantially coplanar. The peripheral edge portion, the spokes and the central annular portion define wedge shaped areas which are depressed rearwardly and which are spaced rearwardly of the plane of the peripheral edge portion. The depth of this rearward spacing is a primary element contributing to the strength of thin sheet material end shields embodying the invention in preferred forms thereof. The portions of the structure that extend axially have effective axial "depths" which form edgewise or ribs that in turn increase the resistance of the bearing support to distortion. The amount of such distortion resistance depends, of course, on the "depth" or "height" of the edgewise beams, and varies with the cube of the height (i.e., to the third power of the height). The peripheral edge portion is provided with bolt accommodating areas between selected adjacent pairs of spokes. These areas, at times, may also be referred to as mounting pads. Each of the wedge shaped areas may be provided with ventilation openings formed therein for "open" motor designs, or may be solid material for "totally closed" motor designs.

End shields embodying the present invention may be made of thinner steel to offset rising material costs. Furthermore, close fitting rabbets may be provided that do not require machining; all while providing a structure that avoids distortion of the lighter gauge material at the bearing due to stresses exerted by clamp bolts.

The axial ribs of the end shield also provide strength for retaining a bearing in its proper axial position under thrust loads applied to the shaft of the motor, or under axial loads caused, e.g., during shipping. The ribbing in the clamp bolt area, which circumscribes the clamp bolt mounting pad, provides the same support of the mounting pad (with the end shield assembled with a stator shell) as a beam placed across the end of the shell. This is accomplished in one actual end shield design by positioning the axially extending beams or ribs between clamp bolt bearing areas (i.e., "mounting pads") and the bearing support in order to establish the above-mentioned distortion isolation effect. This is particularly important when the clamp bolts are extended for end mounting purposes. The placement of the clamp bolt mounting pads between axial ribs (and not on a radially extending bearing support member) minimizes the effect of possible clamp bolt distortion on the radially directed bearing support members which are separated from the mounting pads by axially extending ribs. End shields are made both open and totally enclosed. However, distortion transmission is even further alleviated in end shields with ventilation openings interposed between the clamp bolts and bearing hub.

The total strengthening effect of the ribbing on the end shield of the present invention is attributable to a great extent to the height of the axial ribs and to the fact that ribs are provided in a continuous non-interrupted configuration. For example, if a perpendicular plane containing the central axis is cut through the face of the end shield at any angle, no section can be found where the plane does not cut through either a strengthening rib section or the axial extension of an annular hub (which is also considered a part of the reinforcing rib pattern).

DESCRIPTION OF THE PREFERRED EMBODIMENTS

Figure 1:
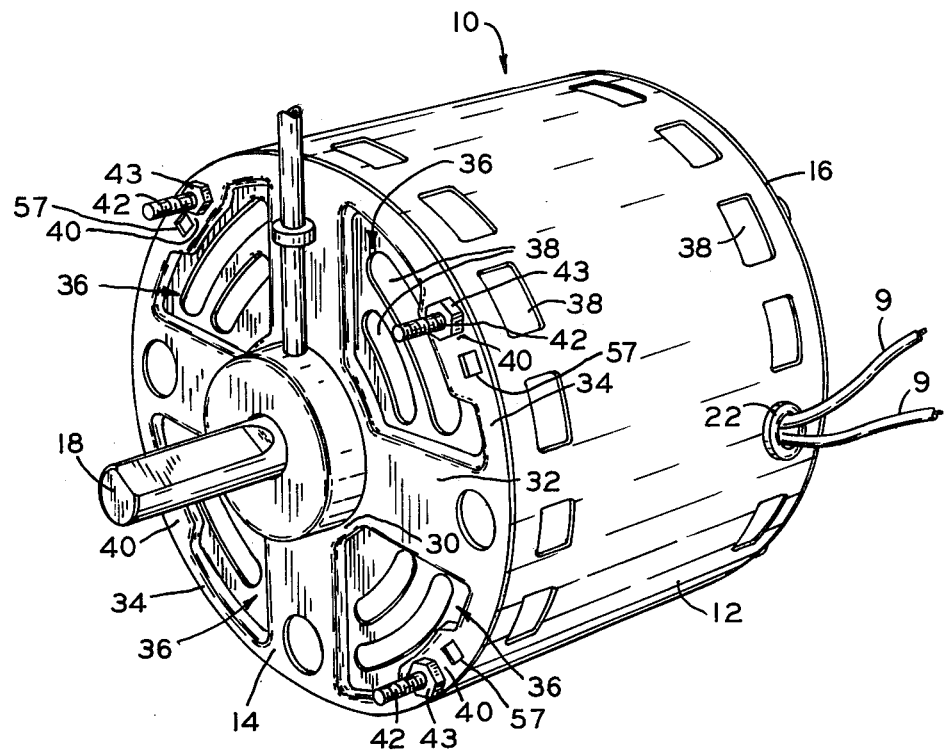
FIG. 1 is a perspective view of an electric motor incorporating a preferred form of the end shield of the present invention.

Referring now to the drawings in more detail, for purposes of disclosure, one preferred form of the present invention is shown as being applied to a small electric induction motor 10 of about ¼ horsepower (i.e., about one hundred and eighty five watts), incorporating a housing or frame constructed with preferred end shields or end frames embodying the present invention in one form thereof.

In the illustrated embodiment, a cylindrical stator shell is formed by a housing or shell 12 whose ends are closed by a pair of end shields or end frames 14 and 16, which serve to support the rotor shaft 18 which has a rotor secured thereto for rotation therewith. As is well known in the art, the shell 12 may be punched out of a sheet of suitable material (such as steel) and then rolled into a generally tubular form having an axial length of predetermined size. The edges of the sheet are secured together by welding or any other suitable fashion. Intermediate the end shields 14 and 16, the shell 12 supports a conventional stator core and excitation windings. The stator core is held in the shell 12 in any well known manner, such as by being press-fit therein. As illustrated, the shell 12 includes an aperture through which power supply leads 9 enter the motor for energization of the stator windings. The shell 12 and leads 9 are protected by a conventional grommet 22 or any other suitable means as will be understood.

Figure 3:
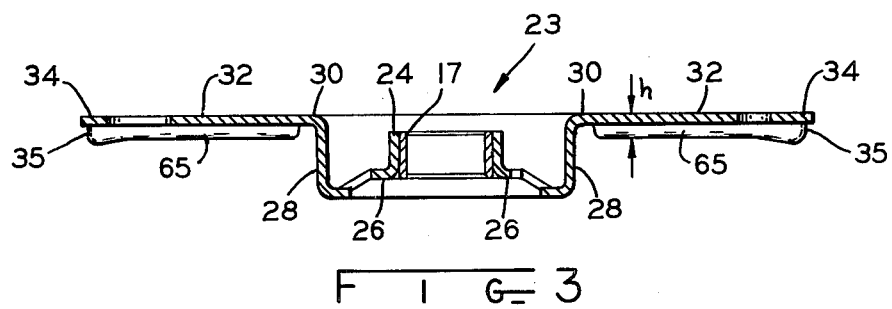
FIG. 3 is a cross-sectional view taken on the line 3—3 of FIG. 2.

The end frames 14 and 16 are of similar construction, each being stamped from 0.055 inch (1.397 mm) steel in the embodiment herein illustrated. Each end shield or end frame 14, 16 comprises a circular element or portion 23 (see FIG. 3) having a central rearwardly extending portion 24 constituting a sleeve bearing accommodating hub. The cylindrical portion 24 terminates in an annular web 26, which in turn terminates in a forwardly (or outwardly) extending cylindrical portion 28 that constitutes a hub coaxial with the rearwardly (or inwardly) extending portion 24. The portion 24 establishes a hub for a sleeve bearing 17 press-fit therein as shown in FIG. 3.

Figure 2:
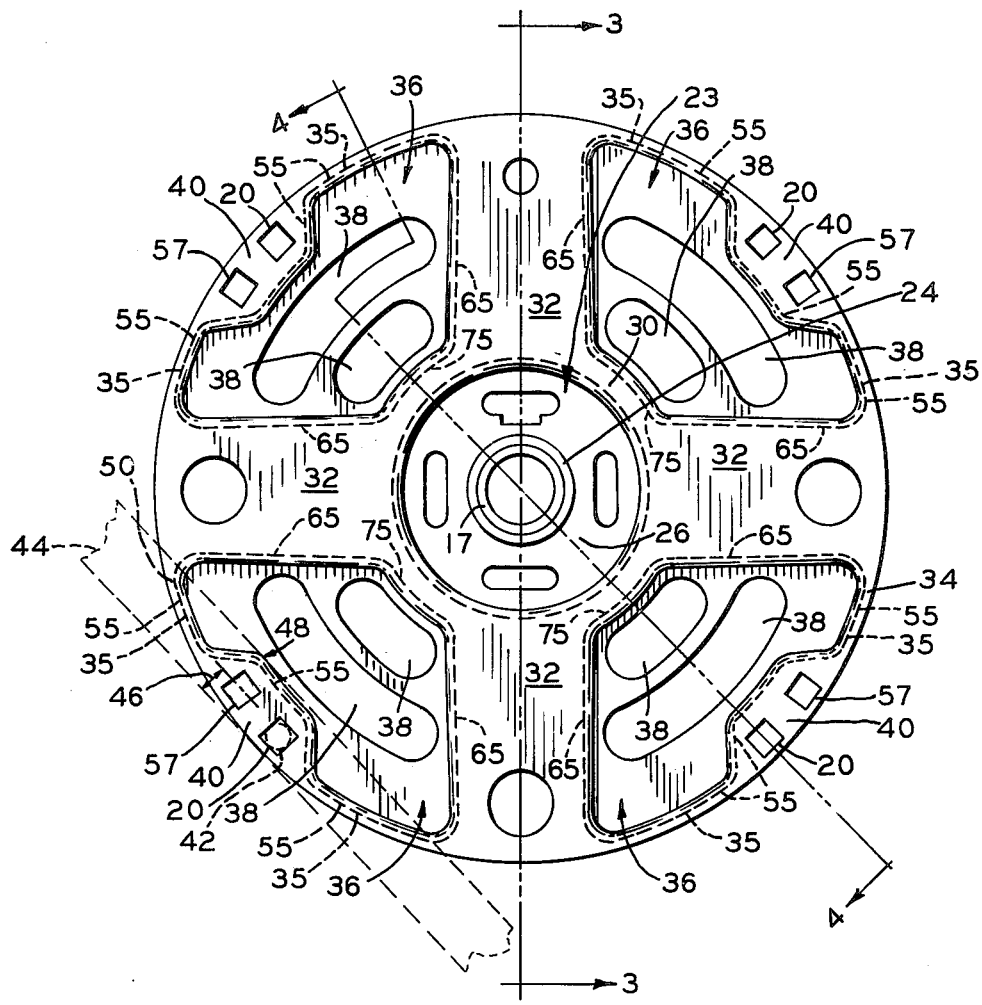
FIG. 2 is a plan view of an end shield of the present invention.

The circular element 23 is also provided with a central annular portion 30 (see FIGS. 2, 3, and 4) surrounding the central rearwardly extending cylindrical portion 24. Four radial spokes 32 extend from the central annular portion 30. The beams 32 are oriented at substantially 90° with respect to each other and lead to a circumferentially extending peripheral edge portion 34. The central annular portion 30, the spokes 32 and the peripheral edge portion 34 are substantially coplanar and define four wedge shaped areas 36 (see FIGS. 1 and 2) which are depressed inwardly (are generally coplanar with each other) and lie in a plane generally parallel to and spaced rearwardly relative to the plane of the central annular portion 30, the beams 32 and the peripheral edge portion 34. The peripheral edge portion 34 is provided with an area 40 of enlarged width between each adjacent pair of spokes 32. These areas define clamp bolt mounting pads.

Although the present invention may be utilized in totally enclosed motor configurations, the motor 10 is of the "open" type. Thus, ventilation openings 38 are provided, and during operation of the motor 10, a flow of cooling medium (e.g., air) moves through these openings and cools the windings and bearing system of the motor. This cooling benefit may be obtained of course whether the motor 10 is of dual or unit bearing design; whether the motor utilizes shading coils or distributed auxiliary windings during starting; and whether or not one or more capacitors are connected in circuit with the energization windings of the motor 10.

The end shields 14 and 16 abut against the shell 12 at each end thereof and are centered by a rabbet surface 35 established by portions of the axial ribbing. The motor 10 may be mounted for use in any conventional manner, such as by straps or the like. However, it would be common for the motor 10 to be firmly mounted onto a stationary support structure such as a a depending wall, in which case the mounting bolts 42 would pass through the wall.

It has been found that tightening of the bolts 42 may cause distortion of the end shields 14, 16. This distortion in turn could transmit stresses to the bearing support hub 24 that would be of such magnitude that the bearing 17 would be caused to cock, and thereby destroy the alignment of the machine parts. In some cases, the misalignment between the bearing 17 and the shaft 18 could be so great that the shaft would actually bind within the bearing 17 and the rotor would be prevented from rotating-all with the result of overheating the windings and ultimate failure of the motor. Accordingly, it is very desirable to provide improved end shields 14, 16 capable of reducing and effectively isolating stresses introduced during assembly or mounting of the motor.

The end shields 14, 16 illustrated herein are so constructed that they may be made of thinner steel to offset rising material costs. Additionally, the construction of the end shields 14, 16 provides for a close fitting rabbet with the shell 12 that will not require machining. Finally, the end shields 14, 16 provide a structure that will not transmit possible distortion of the lighter gauge material at the mounting pad areas 40 to the bearing 17.

The end shields 14, 16 provide substantially increased strength. The central annular portion, 30, the spokes 32, and the peripheral edge portion 34 all contribute to adequate strength to retain the bearing 17 in its proper axial position under shipping or thrust load conditions. The portions 55 of the axial ribs that extend between adjacent pairs of spokes 32, brace the mounting pads for the mounting bolts 42, and the axial height of such ribs provide rabbet surfaces. The rib portions 55 provide the same support of the clamp bolt mounting pad with the end shield 14, 16 assembled in a stator shell 12 as a structural beam 44 placed across the end of the shell, as best seen in the dashed lines in FIG. 2. The strength of the structural beam 44 (and of the rib portions 55 in the end shields 14, 16) is proportional to the cube of the height of the rib in the axial direction (see dimension "h" for this height in FIGS. 3 and 4).

In the embodiment illustrated, the dimension "h" was, in general, in the neighborhood of about 0.143 of an inch. This dimension, as will be understood, would vary somewhat depending on the precision with which design dimensions are held during manufacture of an end frame. For example, when the material of the end frames has been specified to be flat cold rolled steel having a thickness of $$0.053 \, {}^{+.008}_{-.000} \text{ of an inch;}$$

the height "h" minus the material thickness has been specified to be from 0.08 to 0.10 of an inch in thickness. Thus, two actual manufactured parts at the extremes of these tolerance ranges could have dimensions "h" of 0.161 of an inch as a maximum or of 0.133 of an inch minimum.

The dimension 0.161 of an inch is arrived at (as will be understood) by adding together the steel thickness (0.053), the maximum additive tolerance (+0.008), and the maximum offset dimension (i.e., 0.10 rather than 0.08). The minimum dimension 0.133, on the other hand, results from adding together 0.053, no thickness tolerance (i.e., −0.000), and the minimum offset dimension (0.08).

Although it has not been specifically discussed, each mounting pad area includes two generally square holes for accommodating clamp bolts. It will be noted that four of these holes are angularly located at approximately 90° relative to one another. These holes may conveniently be used for four pole motors wherein the magnetic structure is such that the clamp bolts should be spaced apart ninety mechanical degrees. These four holes are located in FIG. 2, in terms of clockwise degrees from the top of section line 3—3, at 45°, 135°, 225°, and 315°. The other four holes, on the other hand, are located, starting at the top section line 3—3, and moving clockwise, at 55°, 125°, 235°, and 305°. For ease of reference, the four-pole clamp bolt holes are identified by the reference numeral 20, and the six-pole clamp bolt holes are identified by the numeral 57.

The moment arm 46 between the center line of the clamp bolt 42 and the edge of the shell is counteracted by an even larger moment arm 48 established between the edge of the beam 44 and its point of contact 50 on the shell. The counteracting moment arm prevents the mounting bolts 42 from tilting inward as the nuts 43 are tightened. This is particularly important when the mounting bolts 42 are extended for end mounting purposes, as previously explained. As previously indicated, areas 40 of enlarged width are positioned between each adjacent pair of spokes 32. Such positioning minimizes the effect of possible distortion at the mounting bolt locations on the bearing support hub 24 because the distortion would have to travel a circuitous route to get around the ribbed reinforcement. The effect of any distortion is further alleviated in end shields 14, 16 with ventilation openings 38 interposed between the mounting bolts 42 and the outer hub 28.

Figure 4:
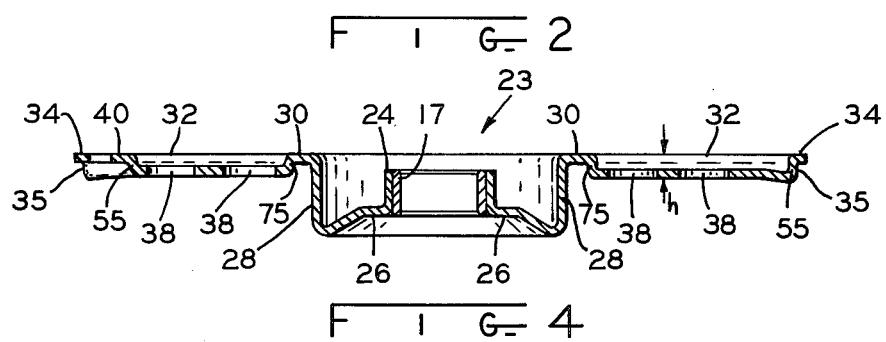
FIG. 4 is a cross-sectional view taken on the line 4—4 FIG. 2.

It should be emphasized that the total strengthening effect of the ribbing on the end shield 14, 16 of the present invention is gained primarily because it is in a pattern such that continuous non-interrupted patterns of ribs or beams separate the mounting pad areas or "pad" and bearing support. The value of the pattern may be seen by imagining a perpendicular plane cutting through the face of the end shield 14, 16 at any angle, such as the cross-section 3—3, as shown in FIG. 3, or the cross-section 4—4, as shown in FIG. 4. It will readily be seen that no section can be found where the plane does not cut through a strengthening rib, such as a rib portion 55, a rib portion 65 or 75, or the hubs 24 and 28. In fact, deflection measurements on end shields 14, 16 indicate that the present end shield of 0.055 inch thick steel is equally as strong as an unribbed, prior art, flat end shield of 0.073 inch flat steel.

If axial motor length permits, the end shields 14, 16 can be easily made two or three times stronger by increasing the height of the ribbing. However, it will be clear that instead of additional strength, a reduction of steel thickness may be more attractive.

In view of the foregoing, it will be understood that the present invention is extremely versatile both in the fabrication and use of embodiments thereof; and that preferred and alternate embodiments of the invention capable of fulfilling the above-stated objects have been disclosed herein. Consequently, while in accordance with the patent statutes, preferred forms of the invention have been described, it will be obvious to those skilled in the art that numerous changes and modifications may be made therein without departing from the true spirit and scope of the invention, and it is therefore aimed in the following claims to cover all such modifications.

What I claim as new and desired to secure by Letters Patent of the United State is:

1. In an electric motor having an outer shell and an end frame at at least one end of said shell; where said end frame comprises a member having a first cylindrical portion constituting a hub, said first cylindrical portion terminates in an annular web, said annular web terminates at a second cylindrical portion coaxial with said first cylindrical portion and comprises a bearing support hub, said member has a central annular portion surrounding said first cylindrical portion, a plurality of radial spokes extend from said central annular portion, said spokes are angularly spaced apart with respect to each other and lead to a peripheral edge portion; said central annular portion, said spokes and said peripheral edge portion are generally coplaner; wherein said peripheral edge portion, said spokes and said central annular portion define four depressed areas which are depressed rearwardly and interconnected with the peripheral edge portion, spokes, and central annular portion with axially extending ribs; and wherein said depressed areas are generally coplanar and lie in a plane generally parallel to and spaced axially from the plane of said central annular portion, spokes, and peripheral edge portion; the improvement wherein: said peripheral edge portion has areas of enlarged width between each adjacent pair of said spokes whereby clamp bolt mounting pads are defined; and wherein said axially extending ribs are positioned between said clamp bolt mounting pads and said central annular portion whereby isolation of said central annular portion from clamp bolt mounting pad distortion is provided.

2. The electric motor according to claim 1, wherein each said depressed area is provided with ventilation openings therein.

3. In an end frame assembly for use in a dynamoelectric machine; wherein said assembly comprises a bearing and an end shield member of sheet material supporting the bearing, said end shield member comprises a central section having an axially extending first cylindrical portion constituting a hub, said first cylindrical portion terminates in an annular web, said annular web terminates in an axially extending second cylindrical portion generally coaxial with said first cylindrical portion and comprises a bearing support hub; wherein said central section has a central annular portion surrounding said first cylindrical portion, and four radial spokes extend from said central annular portion; wherein said spokes are oriented at substantially 90° with respect to each other and lead to a peripheral edge portion; wherein said central annular portion, said spokes, and said peripheral edge portion are generally coplanar with a first reference plane; and wherein said peripheral edge portion, said spokes, and said central annular portion define four areas which are generally coplanar with a second reference plane that is generally parallel to, but offset from, the first reference plane; the improvement wherein: said end shield is formed from relatively thin sheet material; said peripheral edge portion has an area of enlarged width between each adjacent pair of said spokes that defines mounting pads; said four areas each are circumscribed by a substantially continuous axially extending rib; and wherein each substantially continuous rib has portions lying between a mounting pad and the bearing support hub whereby distorting forces applied in the mounting pad areas do not cause bearing alignment distortion.

4. The end frame assembly according to claim 3, wherein each of said four areas is provided with at least one ventilation opening formed therein.

5. In a dynamoelectric machine comprising a shaft, a rotor secured to said shaft for rotation therewith, and a stationary assembly including a stator provided with a bore for receiving the rotor and an end frame formed with at least one end member having a wall section formed of sheet material supporting a bearing for rotatably carrying said shaft; wherein said end member comprises a stamped steel element having a central axially extending first cylindrical portion constituting a hub; wherein said cylindrical portion terminates in an annular web; wherein said annular web terminates in an axially extending second cylindrical portion coaxial with said first cylindrical portion and comprises a bearing support hub; wherein said stamped steel element has a central annular portion surrounding said first cylindrical portion; wherein four radial spokes extend from said central annular portion; wherein said spokes are oriented at substantially 90° with respect to each other and lead to a peripheral edge portion; wherein said central annular portion, said spokes, and said peripheral edge portion are generally coplanar with one another; wherein said peripheral edge portion, said spokes, and said central annular portion define four areas which are depressed relative to the plane of the spokes, but which are generally coplanar with one another and lie in a plane substantially parallel to, but spaced from, the plane of said spokes; and wherein said peripheral edge portion has an area of enlarged width between each adjacent pair of said spokes for defining mounting pads; the improvement wherein: each of the four depressed areas are circumscribed by a continuous axially extending rib that establishes deformation preventing support beams for the end frame assembly; and wherein axially extending rib means establish a rabbet surface useful for locating the end member without the need for rabbet surface machining.

6. The dynamoelectric machine according to claim 5, wherein each of the depressed areas is provided with ventilation openings formed therein.

* * * * *

UNITED STATES PATENT AND TRADEMARK OFFICE
CERTIFICATE OF CORRECTION

PATENT NO. : 4,186,319

DATED : January 29, 1980

INVENTOR(S) : Richard W. Dochterman

It is certified that error appears in the above-identified patent and that said Letters Patent are hereby corrected as shown below:

Col. 2, line 3, after "edgewise" insert --beams--.
Col. 3, line 57, change "beams" to --spokes--.
Col. 5, line 51, change "pad" to --pads--.
Col. 6, line 14, change "desired" to --desire--;
       line 17, (claim 1), change "where" to --wherein--.

Signed and Sealed this

Thirtieth Day of June 1981

[SEAL]

Attest:

RENE D. TEGTMEYER

Attesting Officer

Acting Commissioner of Patents and Trademarks